United States Patent [19]

Pawlak et al.

[11] Patent Number: 4,863,750
[45] Date of Patent: Sep. 5, 1989

[54] METHOD FOR MAKING POTATO CHIPS HAVING BATCH-FRIED TEXTURE AND FLAVOR

[75] Inventors: Janusz Z. Pawlak, El Cajon, Calif.; Jeffrey Kinzbach, Roanoke, Tex.

[73] Assignee: Frito-Lay, Inc., Dallas, Tex.

[21] Appl. No.: 860,436

[22] Filed: May 7, 1986

[51] Int. Cl.⁴ .............................................. A23L 1/217
[52] U.S. Cl. ....................... 426/438; 426/441
[58] Field of Search .................. 426/438, 441, 637

[56] References Cited

U.S. PATENT DOCUMENTS

| | | | |
|---|---|---|---|
| 2,207,316 | 7/1940 | Ferry | 53/21 |
| 2,855,308 | 10/1958 | Buechele et al. | 426/438 |
| 3,885,056 | 5/1975 | Smith et al. | 426/441 |
| 3,998,975 | 12/1976 | Liepa | 426/550 |
| 4,020,189 | 4/1977 | Wright et al. | 426/438 |
| 4,272,554 | 6/1981 | Schroeder et al. | 426/321 |
| 4,277,510 | 7/1981 | Wicklund et al. | 426/441 |
| 4,363,823 | 12/1982 | Kimura et al. | 426/542 |
| 4,537,786 | 8/1985 | Bernard | 426/438 |

FOREIGN PATENT DOCUMENTS 750479 10/1970 Belgium .............................. 426/441

Primary Examiner—Arthur L. Corbin
Attorney, Agent, or Firm—Bernard, Rothwell & Brown

[57] ABSTRACT

Potato chips having texture and flavor characteristics of batch-fried potato chips are produced in a continuous process by conveying potato slices from an initial frying region having a temperature of from about 240° F. to about 320° F. through an intermediate frying region of decreasing oil temperature to a final frying region having a temperature of from about 210° F. to about 290° F., where the chips are continuously removed from the frying oil.

7 Claims, 1 Drawing Sheet

METHOD FOR MAKING POTATO CHIPS HAVING BATCH-FRIED TEXTURE AND FLAVOR

BACKGROUND OF THE INVENTION

1. Field of the Invention

The present invention relates to continuous production of fried potato chips.

2. Description of the Background Art

Commercial production of potato chips typically involves a continuous process wherein sliced potatoes are continuously introduced into a vat of frying oil at a temperature of about 365°–385° F., conveyed through the oil by paddles or other means, and removed from the oil by an endless conveyor belt after the moisture content of the chips has been reduced to about 2% by weight or less. The resulting product generally has texture and flavor characteristics which are usually recognizable by consumers as typical commercially produced potato chips.

Potato chips produced by batch processes in kettle fryers have texture and flavor characteristics which are usually recognized by consumers as being distinctly different from typical commercially produced continuous process potato chips. As the name implies, batch process kettle frying of potato chips involves placing a batch of potato slices in a kettle of hot oil (e.g., at 310° F.). Upon introduction of the potato slices into the oil, the temperature of the oil rapidly drops as much as 50° F. or more, and then the temperature of the oil begins to gradually rise to achieve approximately the same temperature at which the slices were introduced into the oil at the bubble end point or BEP of the chips (about 2% moisture content or less). The finished potato chips are then removed as a batch from the kettle before frying another batch of potato slices.

Batch fried chips are generally harder and more crunchy than continuously fried chips and have a flavor that some consumers find more appealing than continuously fried commercial chips. However, batch production of potato chips is not commercially desirable since batch processes are generally substantially more expensive and less efficient than continuous processes.

There thus remains a need in the art for a continuous process for the production of potato chips having a batch-fried texture and flavor.

SUMMARY OF THE INVENTION

In accordance with the present invention, a continuous process for the production of potato chips having texture and flavor characteristics of batch-fried chips comprises providing a vat of frying oil, the oil having initial and final frying regions and an intermediate frying region therebetween. The final frying region has a temperature below that of the initial frying region, the initial frying region having a temperature of from about 240° F. to about 320° F., and the temperature of the oil decreasing through the intermediate frying region to a temperature of from about 210° F. to about 290° F. in the final frying region. Potato slices are continuously introduced into the frying oil at the initial frying region, and the frying potato slices are continuously conveyed in the frying oil from the initial frying region through the intermediate frying region to the final frying region to fry the potato slices and produce potato chips. The fried potato chips then are continuously removed from the final frying region of the oil.

DESCRIPTION OF THE PREFERRED EMBODIMENTS

Applicants have surprisingly discovered that potato chips having texture and flavor characteristics of batch-fried chips can be produced in a continuous process. To continuously produce potato chips which mimic batch-fried chips, the process of this invention utilizes frying oil having a substantially lower initial frying temperature than conventional continuous processes for commercially producing potato chips.

Potato slices for making potato chips using this invention can be formed from potatoes by any of various known devices which are available for use in slicing potatoes to be made into potato chips. Typically, whole, raw potatoes may be scrubbed prior to slicing and may be either peeled or left unpeeled. Generally, individual potato slices having a thickness of from about 0.03 to 0.1 inch have been found to be suitable for making into potato chips according to the process of the invention, although a slice thickness of from about 0.05 to 0.08 inch is preferred. If desired, the potatoes can be blanched prior to slicing by contacting the potatoes with water at a temperature of, for example, from about 120°–212° F., for a short period of time such as about 10 seconds to 3 minutes. After slicing, the slices may be washed to diminish the tendency of the slices to stick together or to stick to machinery.

Figure 1:
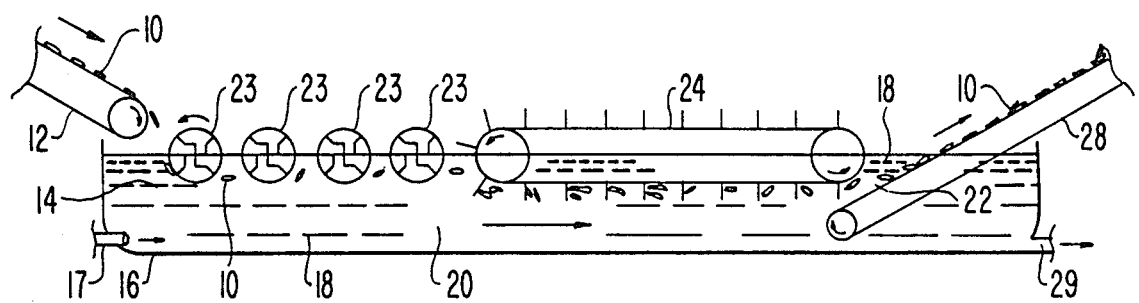
FIG. 1 is a schematic diagram showing potato chips being produced according to the continuous process of this invention.

With reference to FIG. 1, raw potato slices 10 are transported by an endless conveyor 12 and continuously introduced into an initial frying region 14 in a vat 16 of frying oil 18. Frying oil at a temperature of from about 240° F. to about 320° F. is introduced into the vat 16 at oil inlet 17 to provide an oil temperature in the initial frying region 14 of from about 240° F. to about 320° F., which is substantially lower than the initial frying temperatures in conventional continuous frying methods.

Initial oil frying temperatures of up to about 320° F. have been found to produce finished chips with the desired textural and flavor properties. Initial oil temperatures above approximately 320° F. produce finished potato chips with a softer internal texture and a flavor more like regular potato chips.

Initial oil frying temperatures below approximately 320° F. (but above approximately 240° F.) produce desirable textural and flavor properties but the degree of chip hardness increases with decreasing initial oil temperatures. Concomitantly, as the initial oil temperature is decreased, the time required to reduce chip moisture to the desired finished percentage is increased.

The temperature of the frying oil in the vat decreases from the initial frying region 14 through an intermediate frying region 20 to a final frying region 22 where the temperature of the oil is from about 210° F. to about 290° F. Potato slices are continuously conveyed in the frying oil from the initial frying region through the intermediate region to the final frying region using any suitable means such as paddle wheels 23 and/or endless conveyor 24 as shown in FIG. 1. Paddle wheels 23 and endless conveyor 24 carry potato slices 10 beneath the surface of the frying oil through the regions of decreasing temperature to fry the slices and form potato chips. When the fried potato slices are released from conveyor 24 in the final frying region 22, the potato chips float to the surface of the oil and are continuously removed from the final frying region by an endless conveyor 28.

Oil from the final frying region is removed from vat 16 through oil outlet 29 and can be reheated to the initial frying temperature before being reintroduced into the vat through oil inlet 17.

Fried potato chips are generally removed from the frying oil after reaching the "Bubble end point" or BEP of the chips, which indicates a moisture content of about 2% by weight or less. The slices are conveyed through the vat by paddles 23 and conveyor 24 at a rate of speed sufficient to reduce the moisture content of the slices to about 2% or less upon reaching take-out conveyor 28. The speed at which the slices are conveyed through the vat is dependent upon the size of the vat and the temperature decrease of oil from the initial frying region to the final frying region, such conveyance speed thus being routinely determinable depending upon the equipment utilized. Typically, the difference in oil temperature between the initial frying region and the final frying region is 10°–30° F.

According to one embodiment, the initial frying region has a temperature of from about 280° F. to about 310° F., and the final frying region has a temperature of from about 250° F. to about 280° F., with a temperature difference between the initial frying region and the final frying region of about 20° F. or more.

In a particularly preferred embodiment, the initial frying region has a temperature of about 300° F. and the temperature decreases through the intermediate frying region to a final frying region at a temperature of about 270° F. to about 280° F. Under these conditions, the bubble end point of the chips is usually reached in 8–9 minutes.

Figure 2:
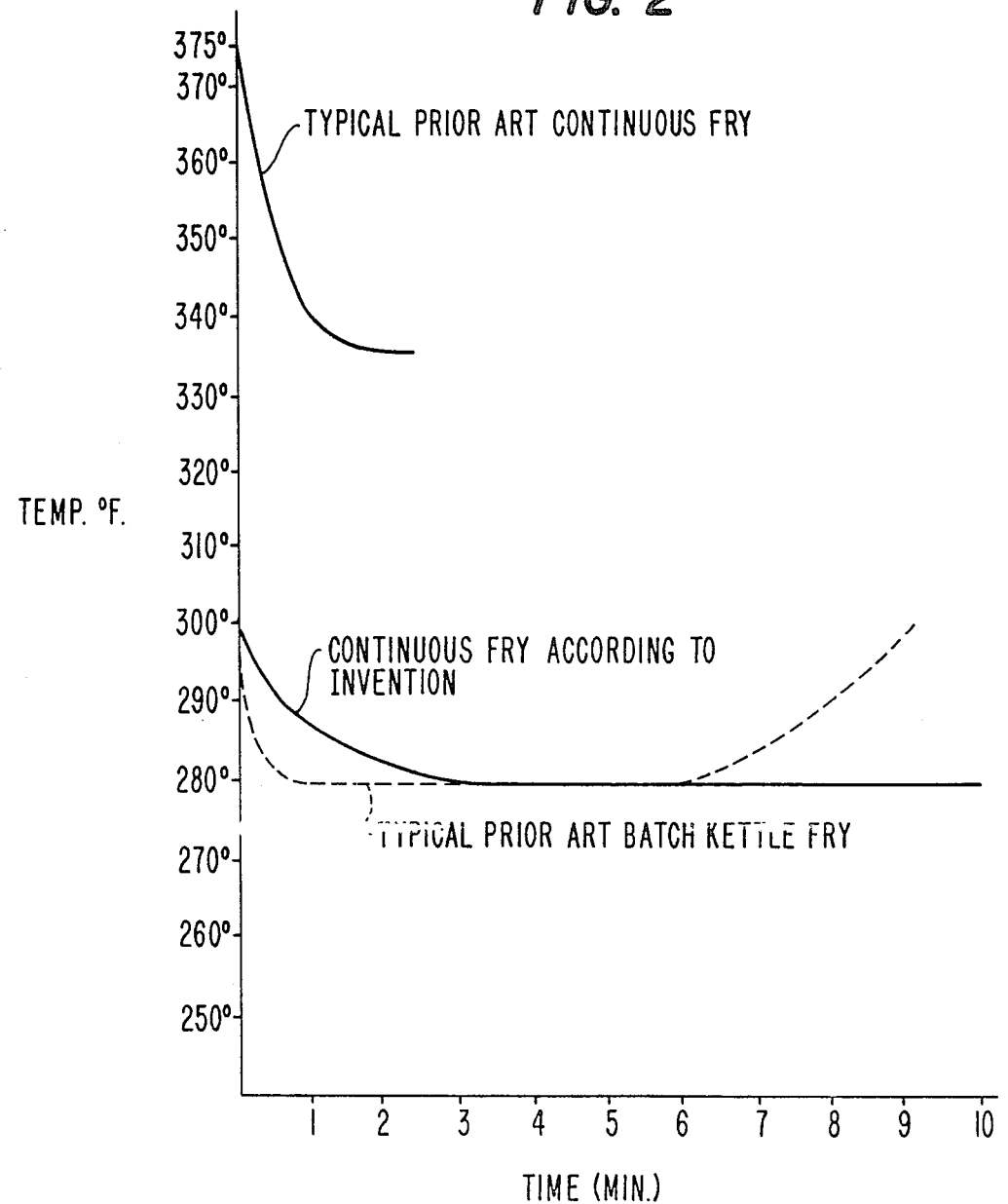
FIG. 2 is in graphic comparison of temperature versus time curves for prior art continuous and batch kettle frying, and continuous frying according to the invention.

FIG. 2 compares frying oil temperature versus frying time curves for standard commercial type potato chips, typical batch kettle fried potato chips, and continuously fried potato chips according to the present invention. Although the curves are substantially different, potato chips produced according to the continuous fry process of this invention have been judged by consumers to be similar to batch kettle fried potato chips and distinctly different from conventional continuously produced potato chips.

To physically compare chips according to the invention with batch kettle fried chips, a Voland Texturometer was utilized to analyze chips according to the invention and four brands of commercially available batch kettle fried chips. For this analysis, fifteen individual samples from each of six bags of each product brand were tested for a total of 90 tests per each brand of chip. The results set forth in Table 1 below show the similarities between chips according to the invention and commercially available batch kettle fried potato chips.

TABLE 1

| Chip Type | Market Samples | | |
|---|---|---|---|
| | Voland Average | Standard Deviation | CV %* |
| Invention | 472 | 130 | 27.4 |
| Brand A | 581 | 181 | 31.2 |
| Brand B | 485 | 143 | 29.0 |
| Brand C | 432 | 126 | 28.5 |

TABLE 1-continued

| Chip Type | Market Samples | | |
|---|---|---|---|
| | Voland Average | Standard Deviation | CV %* |
| Brand D | 576 | 121 | 21.0 |

*CV % = $\frac{\text{standard deviation}}{\text{mean}} \times 100$

Potato chips prepared in a typical continuous process with high temperature frying were compared to potato chips prepared according to the invention in different embodiments thereof. For this analysis, fifteen individual samples of each of three chip types were tested. The results shown in Table 2 below illustrate the differences between the invention and prior art continuous fry chips. It is apparent that lower initial frying temperatures increase chip hardness, with a longer frying time requirement.

TABLE 2

| Chip Type | Temperature Profiles Test | | | |
|---|---|---|---|---|
| | Fry Time (min.) | Voland Average | Standard Deviation | CV %* |
| 380$^a$/360$^b$ (prior art) | 3 | 394 | 61 | 15.5 |
| 300$^a$/280$^b$ (invention) | 9.5 | 471 | 63 | 13.4 |
| 260$^a$/240$^b$ (invention) | 30 | 596 | 145 | 24.3 |

*CV % = $\frac{\text{standard deviation}}{\text{mean}} \times 100$
$^a$initial (input) frying temperature
$^b$temperature that oil dropped to during frying and was thereafter maintained at The invention will be further described by the following example which is not intended to be limiting.

EXAMPLE

Raw Monona potatoes are peeled and sliced to a thickness of 0.07 inch. The potato slices are fried using an apparatus as schematically illustrated in FIG. 1, wherein the potato slices are introduced into an initial frying region at a temperature of about 300° F., conveyed through an intermediate frying region of decreasing oil temperature to a final frying region having a temperature of about 270° F., during which the moisture content of the chips is reduced to about 2% or below. The fried potato chips are removed from the frying oil, salted and bagged. The continuously produced fried potato chips have a flavor and texture similar to batch kettle-fried chips.

What is claimed is:

1. A continuous process for the production of potato chips having texture and flavor characteristics of batch-fried potato chips comprising:

(a) providing a vat of frying oil, the oil having initial and final frying regions and an intermediate frying region therebetween, the final frying region having a temperature below that of the initial frying region, the initial frying region having a temperature of from about 240° F. to about 320° F., the temperature of the frying oil decreasing from the initial frying region through the intermediate frying region to a temperature of from about 210° F. to about 290° F. in the final frying region;

(b) continuously introducing potato slices into the frying oil at the initial frying region;

(c) continuously conveying the potato slices in the frying oil from the initial frying region through the intermediate frying region to the final frying region to fry the potato slices and produce potato chips; and (d) continuously removing fried potato chips from the final frying region of the oil when the chips have a moisture content of 2% by weight or less.

2. The process of claim 1 wherein the initial frying region has a temperature of from about 280° F. to about 310° F., and the final frying region has a temperature of from about 250° F. to about 280° F.

3. The process of claim 2 wherein the temperature decrease of the frying oil from the initial frying region to the final frying region is at least about 20° F.

4. The process of claim 2 wherein the temperature decrease of the frying oil from the initial frying region to the final frying region is at least about 30° F.

5. The process of claim 1 wherein the temperature decrease of the frying oil from the initial frying region to the final frying region is at least about 20° F.

6. The process of claim 1 wherein the temperature decrease of the frying oil from the initial frying region to the final frying region is at least about 30° F.

7. The process of claim 1 wherein the initial frying region has a temperature of about 300° F. and the final frying region has a temperature of from about 270° F. to about 280° F.

* * * * *